US011105723B2

(12) United States Patent
Mohanarangam et al.

(10) Patent No.: US 11,105,723 B2
(45) Date of Patent: Aug. 31, 2021

(54) AUTOMATIC SEDIMENTATION AND SEPARATION CURVE GENERATOR

(71) Applicant: Commonwealth Scientific and Industrial Research Organisation, Acton (AU)

(72) Inventors: Krishna Mohanarangam, Acton (AU); Andreas Monch, Acton (AU)

(73) Assignee: COMMONWEALTH SCIENTIFIC AND INDUSTRIAL RESEARCH ORGANISATION, Acton (AU)

(*) Notice: Subject to any disclaimer, the term of this patent is extended or adjusted under 35 U.S.C. 154(b) by 206 days.

(21) Appl. No.: 16/327,180

(22) PCT Filed: Aug. 16, 2017

(86) PCT No.: PCT/AU2017/050872
§ 371 (c)(1),
(2) Date: Feb. 21, 2019

(87) PCT Pub. No.: WO2018/035558
PCT Pub. Date: Mar. 1, 2018

(65) Prior Publication Data
US 2019/0212243 A1 Jul. 11, 2019

(30) Foreign Application Priority Data
Aug. 22, 2016 (AU) ................................ 2016903332

(51) Int. Cl.
*G01N 15/04* (2006.01)
(52) U.S. Cl.
CPC ..................... *G01N 15/04* (2013.01)
(58) Field of Classification Search
CPC .................................................... G01N 15/04
See application file for complete search history.

(56) References Cited

U.S. PATENT DOCUMENTS 3,621,243 A * 11/1971 Olivier .................. G01N 15/04
378/51
4,609,991 A * 9/1986 Minton .................. G01N 15/04
356/246

(Continued)

FOREIGN PATENT DOCUMENTS

CN 105865991 A 8/2016
DE 2825659 A1 12/1979

(Continued)

OTHER PUBLICATIONS

International Search Report for corresponding PCT Application No. PCT/AU2017/050872, dated Sep. 7, 2017.

(Continued)

*Primary Examiner* — Xin Y Zhong
(74) *Attorney, Agent, or Firm* — Crowell & Maring LLP

(57) ABSTRACT

Described embodiments relate to a hand-held portable sedimentation measurement device, comprising: a closeable fluid container having a container wall and defining a chamber to receive fluid for sedimentation measurement and defining a central longitudinal axis; multiple light sources disposed along the container and generally parallel to the longitudinal axis to direct light through the wall into the chamber; multiple light sensors disposed along the container arranged to detect light passing through the chamber from at least one of the light sources; a controller configured to control emission of light from the sources and to receive detection signals from the light sensors, wherein sedimentation measurements are derived from the light emitted from the light sources and the detection signals; a communication interface coupled to the controller and arranged to transmit sedimentation data to an external computing device; and a housing connected to the container and housing the controller and interface.

26 Claims, 14 Drawing Sheets

(56) References Cited

U.S. PATENT DOCUMENTS

| | | | | |
|---|---|---|---|---|
| 4,876,069 A * | 10/1989 | Jochimsen | .......... | B01F 13/0818 |
| | | | | 422/73 |
| 6,336,358 B1 * | 1/2002 | Kishimori | ............ | G01N 15/042 |
| | | | | 73/61.65 |
| 2010/0279397 A1 * | 11/2010 | Crawford | ............ | B01L 3/50825 |
| | | | | 435/307.1 |
| 2014/0231680 A1 * | 8/2014 | Klinec | ................. | G01N 21/253 |
| | | | | 250/564 |
| 2016/0123862 A1 * | 5/2016 | Halvorsen | ............ | G01N 15/042 |
| | | | | 494/7 |
| 2016/0124007 A1 * | 5/2016 | Duglio | .................... | G01N 25/00 |
| | | | | 702/179 |
| 2016/0266023 A1 * | 9/2016 | Gratiot | .................... | G01N 15/10 |
| 2016/0356691 A1 * | 12/2016 | Engels | .................. | G01N 15/04 |

FOREIGN PATENT DOCUMENTS

| | | | |
|---|---|---|---|
| DE | 260991 A1 | 10/1988 | |
| JP | S6391561 | 7/1988 | |
| KR | 10-1552201 | 9/2015 | |
| WO | WO 1998/002726 A1 | 1/1998 | |

OTHER PUBLICATIONS

Written Opinion of the International Searching Authority for corresponding PCT Application No. PCT/AU2017/050872, dated Sep. 7, 2017.

* cited by examiner

AUTOMATIC SEDIMENTATION AND SEPARATION CURVE GENERATOR

CROSS-REFERENCE TO RELATED APPLICATIONS

This application is the U.S. National Stage application of PCT Application No. PCT/AU2017/050872, filed on Aug. 16, 2017, designating the United States, which claims priority to Australian Patent Application 2016903332, filed Aug. 22, 2016, which are incorporated herein by reference.

TECHNICAL FIELD

Embodiments generally relate to devices, systems and methods for determining sedimentation or separation rate within in a multiphase liquid sample.

BACKGROUND

For certain mineral extraction processes, particularly those involving very low concentrations of a desirable mineral in the extracted ore body, it can be desirable to ascertain a rate of sedimentation in process liquids over time.

In prior techniques, this has been done by taking a liquid sample during a stage of the mineral separation process and having a human operator take measurements over time by observing the sample in the settling cylinder as sediment in the sample settles to the bottom of the tube. However, the reliance on human judgement can be problematic, since the human operator may find it difficult to precisely determine the transition between different parts of the fluid sample due to cloudiness or otherwise blurred boundaries.

Accurate tracking of the rate of sedimentation of a sample can be important to determining how much flocculent to use in the separation process. The amount of flocculent used in the separation process over time can have a significant cost impact in operation of the core processing facility. Further, applying the right amount of flocculent can have an effect on the waste output from the separation process. In particular, when consistent tailings output through the separation process can be maximised, which can result in millions of dollars in savings by avoiding prematurely upgrading tailings capture infrastructure, such as tailing dams which are expensive to build and/or upgrade.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to a hand-held portable sedimentation measurement device, comprising:

a closeable fluid container having a container wall and defining a chamber to receive fluid for sedimentation measurement and defining a central longitudinal axis;

a plurality of light sources disposed along the fluid container and generally in a direction parallel to the longitudinal axis to direct light through the container wall into the chamber;

a plurality of light sensors disposed along the fluid container and arranged to detect light passing through the chamber from at least one of the light sources;

a controller configured to control emission of light from the plurality of light sources and to receive light detection signals from the plurality of light sensors, wherein sedimentation measurements can be obtained based on the light emitted from the plurality of light sources and the light detection signals;

a communication interface communicably coupled to the controller and arranged to transmit sedimentation measurement data to an external computing device; and a housing connected to the container to house the controller and the communication interface.

The plurality of light sources may be light-emitting diodes (LEDs). The LEDs may be infra-red (IR) light transmitting LEDs. An emission spectrum of each of the LEDs may have a peak at a wavelength in the range of about 880 nm to about 950 nm.

The device may further comprise a battery power supply housed in the housing and arranged to supply power to all power-consuming components of the device.

The device may further comprise an accelerometer arranged to detect movement of the fluid container and to provide an accelerometer output signal to the controller to allow the controller to measure agitation of the fluid container. The accelerometer may be disposed in the housing and configured to measure acceleration of the fluid container in three dimensions. The controller may be configured to determine, based on received accelerometer output signals, whether a minimum agitation amount has occurred. When the controller determines that agitation of the fluid chamber has ceased before the minimum agitation amount has been reached, the controller may be configured to generate a first alarm signal. The controller may be configured to determine, based on received accelerometer output signals, whether a maximum agitation amount has occurred. When the controller determines that a maximum agitation amount has occurred, the controller may be configured to generate a second alarm signal.

The plurality of light sources may be disposed along between 50% and 90% of the longitudinal length of the fluid chamber. The number of light sensors may be less than the number of light sources.

The plurality of light sources and the plurality of light sensors may be arranged so that a path of maximum light transmission efficiency from the light sources to the light sensors is offset from the central longitudinal axis.

The fluid container may comprise a light shield disposed at or around a first side of the container to completely or substantially attenuate light from the light sources through the first side of the fluid container.

A second side of the container wall that is opposite the first side may be substantially light-transmissive for human-visible wavelengths of light. The device may further comprise at least one second light source configured to emit human-visible wavelengths of light and disposed on the first side to emit light toward the second side.

The controller may be configured to separately control emission of light from each of the light sources. The controller may be configured to operate each of the light sources at a high intensity for a short time.

The controller may be configured to separately control each of the light sensors to detect light at a time when at least one of the light sources is emitting light. The controller may be configured to enable light detection at only one light sensor while controlling light emission from multiple ones of the light sources.

The light sources and light sensors may be disposed at least partially in the container wall. In some embodiments, the container and the light sources and/or light detectors may be integrally formed.

The container may be free of fixed internal agitation means.

The device may further comprise an excitation coil in the housing to induce rotational motion of a magnet when the magnet is freely disposed in a base of the container.

A volumetric capacity of the container may be between about 0.5 litres and about 2 litres. The container may be cylindrical. An inside diameter of the container may be between about 30 mm and about 100 mm.

The light sources may be of a power sufficiently high to reliably penetrate a high density mineral slurry sample during settling of the sample.

Some embodiments relate to a sedimentation measurement method, comprising:

receiving a sample liquid of a metallurgical process in a chamber of a liquid container having a volumetric capacity of between about 0.5 litres to about 2 litres;

transmitting control signals to one or more of multiple high radiant intensity infra-red (IR) light sources to cause light from the one or more IR light sources to be directed into the chamber through a wall of the liquid container;

detecting light passing through the chamber from the one or more light sources by at least one of a plurality of light sensors; and determining sedimentation measurements for the sample based on the control signals and based on light detection signals received from the at least one light sensor.

The container may be cylindrical and an inside diameter of the container may be between about 30 mm and about 100 mm.

The light sources may be of a power sufficiently high to reliably penetrate a high density mineral slurry sample during settling of the sample.

The method may further comprise emit human-visible wavelengths of light from at least one second light source disposed on a first side of the liquid container toward a second side of the liquid container.

In some embodiments, the transmitting may be performed by a controller and the controller may be configured to separately control emission of light from each of the light sources. For example, the controller may be configured to operate each of the light sources at a high intensity for a short time. In some embodiments, the controller may be configured to separately control each of the light sensors to detect light at a time when at least one of the light sources is emitting light. In some embodiments, the controller may be configured to enable light detection at only one light sensor while controlling light emission from multiple ones of the light sources.

The method may further comprise measuring agitation of the liquid sample in the fluid container. The measuring agitation may be performed using an accelerometer arranged to detect movement of the fluid container and to provide an accelerometer output signal. The method may further comprise determining, based on received accelerometer output signals, whether a minimum agitation amount has occurred.

In some embodiments, the method may comprise generating a first alarm signal when it is determined that agitation of the fluid chamber has ceased before the minimum agitation amount has been reached. In some embodiments, the method may further comprise determining, based on received accelerometer output signals, whether a maximum agitation amount has occurred. In some embodiments, the method may further comprise generating a second alarm signal when the controller determines that a maximum agitation amount has occurred.

In some embodiments, the one or more light sources and/or the plurality of light sensors are disposed at least partially in the wall of the liquid container. For example, the liquid container and the one or more light sources and/or the plurality of light detectors are integrally formed.

Some embodiments relate to a hand-held portable sedimentation measurement device, comprising:

a closeable fluid container having a container wall and defining a chamber to receive fluid for sedimentation measurement and defining a central longitudinal axis;

a plurality of light sources disposed along the fluid container and generally in a direction parallel to the longitudinal axis to direct light through the container wall into the chamber;

a plurality of light sensors disposed along the fluid container and arranged to detect light passing through the chamber from at least one of the light sources;

a controller configured to control emission of light from the plurality of light sources and to receive light detection signals from the plurality of light sensors, wherein sedimentation measurements can be obtained based on the light emitted from the plurality of light sources and the light detection signals;

a communication interface communicably coupled to the controller and arranged to transmit sedimentation measurement data to an external computing device; and a housing connected to the container to house the controller and the communication interface;

wherein the light sources and light sensors are disposed at least partially in the container wall.

Some embodiments relate to a sedimentation measurement method, comprising:

receiving a sample liquid of a metallurgical process in a chamber of a liquid container having a volumetric capacity of between about 0.5 litres to about 2 litres;

transmitting control signals to one or more of multiple high radiant intensity infra-red (IR) light sources to cause light from the one or more IR light sources to be directed into the chamber through a wall of the liquid container;

detecting light passing through the chamber from the one or more light sources by at least one of a plurality of light sensors;

determining sedimentation measurements for the sample based on the control signals and based on light detection signals received from the at least one light sensor;

wherein the one or more light sources and/or the plurality of light sensors are disposed at least partially in the wall of the liquid container.

BRIEF DESCRIPTION OF DRAWINGS

Embodiments are described in further detail below by way of example and with reference to the accompanying drawings, in which.

DETAILED DESCRIPTION

Embodiments generally relate to devices, systems and methods for measuring sedimentation or separation rate within a multiphase liquid sample.

Embodiments have specific application to measuring the sedimentation rate (also called settling rate) of liquid samples taken from mineral processing operations where the density of the sample taken can be relatively high. With high density samples such as those that may be obtained for mineral processing of low grade ores, a light source of relatively high radiant intensity may be required for accurate determination of the level of "mud-line" (the level below which the solids in the sample have settled and above which is relatively clear water over time).

Accurate detection of the mud line is important for determining an optimal amount of sedimentation enhancing chemicals, such as flocculent, to be added during the mineral processing. If too much flocculent is added during the mineral processing (i.e. overdosing), then there is a monetary cost for unnecessary wastage of flocculent. Additionally, there is also a risk that the sediment from the process can get too thick, in which case there is a higher risk that blades of a thickener rake in a sedimentation tank can break, which can lead to costly downtime and operational losses. On the other hand, if the flocculent is inadequately supplied to the process (i.e. underdosed), then there may be less separation of fine particles and potentially less mineral capture from the process. This reduced capture can be particularly costly when the minerals sought to be captured from the process is already present in only small concentrations, such as 1 to 5 grams per metric tonne or even lower.

Described embodiments therefore aim to provide an accurate measurement of rate of sedimentation for mineral processes directed to extracting high value of low concentration of minerals from ore bodies. Since the rate of sedimentation or settlement of such samples is relatively high compared to sewerage sedimentation, for example, and the density of particulate in the samples is relatively higher, high intensity light sources are required.

Figure 1:
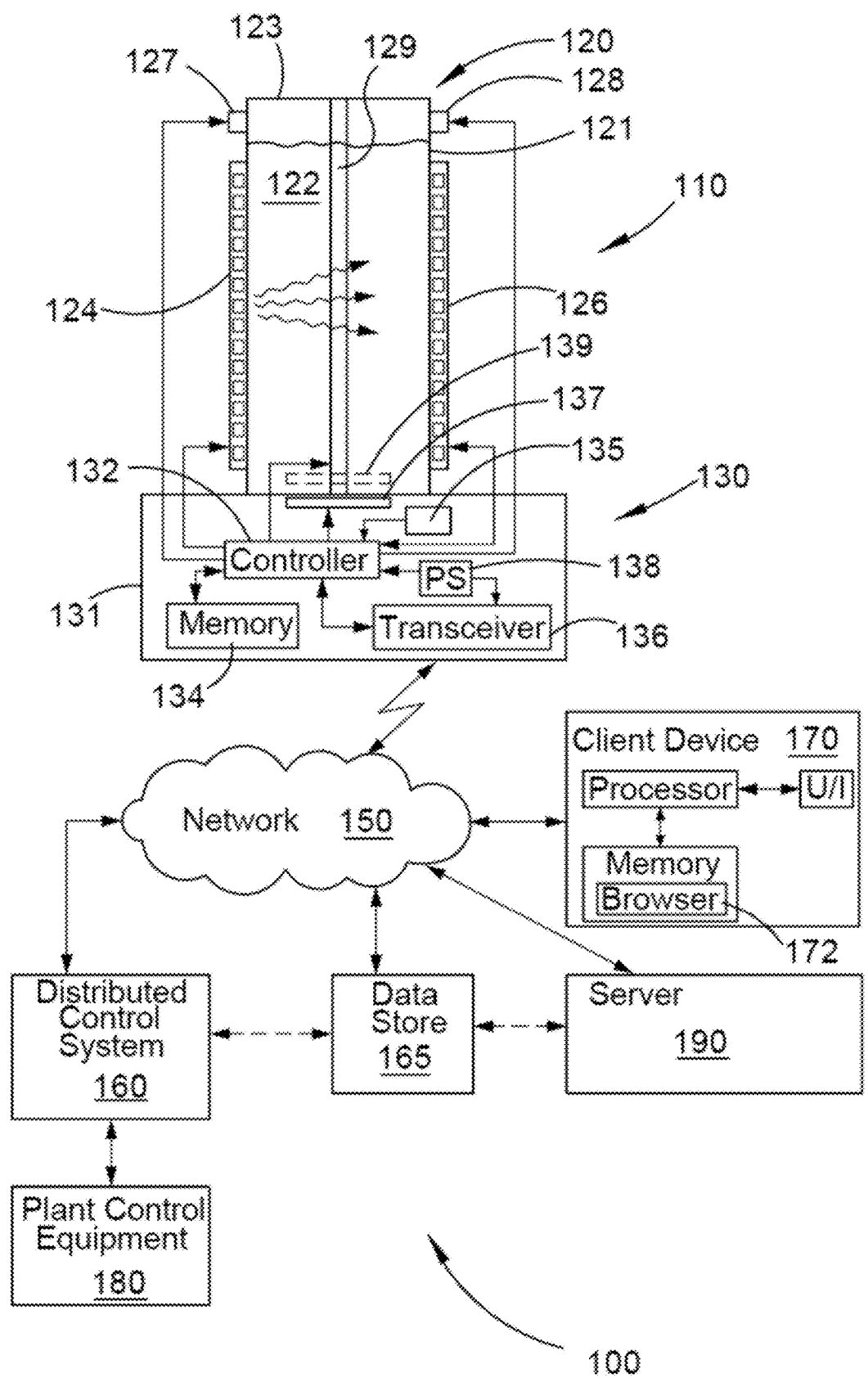
FIG. 1 is a schematic block diagram of a system comprising a sedimentation measurement device.

Referring now to FIG. 1, a system 100 is shown, comprising a sedimentation measurement device 110. The sedimentation measurement device 110 is in communication with a client computing device 170 over a network 150 in order to provide data to enable display of a sedimentation curve (indicating a rate of settlement of solids in liquid samples) over time. The client computing device 170 may be in communication with a server 190 via the network 150. The sedimentation measurement device 110 may also interact with the server 190 in order to process data received from a transceiver 136 of the sedimentation measurement device 110 so that a suitable graphical display can be generated at a browser application 172 executing (as stored executable programme code executed by a processor) at the client device 170. For this purpose, server 190 has at least one processor and memory to store executable programme code for interacting with the sedimentation measurement device 110 and client device 170. The server 190 is configured to access a data store 165, either directly or via the interwork 150, in order to serve suitable web page code to the client device 170 for rendering display by the browser application 172. Data store 165 may store, for example, historical sedimentation curves and other sedimentation measurement related information.

The network 150 may include local network components that are part of a local area network (LAN) including wireless and/or wired communication connections. Further, the network 150 may include mobile data communication connections, public communication infrastructure or a combination of various local, public, private or mobile data network components and connections.

In some embodiments, the system 100 may form part of or be associated with a mineral (separation) processing facility or another processing facility requiring sedimentation measurement. Such processing facilities may rely on a distributed control system 160 (DCS) to monitor and control the mineral separation or other process. In specific embodiments, the sedimentation measurement device 110 may provide its data output from transceiver 136 to DCS 160 via the network 150 (which may include a local area network of the processing facility). The DCS 160 may access data store 165, via the network 150 or directly, for storage of data received from sedimentation measurement device 110 or to look up historical sedimentation measurement data, for example.

In some instances, the DCS 160 may automatically adjust one or more monitoring or control parameters associated with the processing facility based on sedimentation measurement data received from the sedimentation measurement device 110. The DCS 160 may therefore issue control commands to operate (or adjust operation of) plant control equipment 180 forming part of the processing facility, in order to achieve a better process result. For example, the DCS 160 may issue control commands to plant control equipment 180 in order to increase or decrease the amount of flocculent provided to a mineral separation process performed by the processing facility.

The sedimentation measurement device 110 comprises a container 120 that is coupled (mechanically and/or by adhesion) to a housing 130 at a base end of the container 120. The container 120 has a container wall 121 that defines an inner chamber to receive a liquid sample 122, and a lid, top or cap 123 to close and seal the chamber. The container wall 121 may be cylindrical, somewhat cylindrical or oval, for example.

A volumetric capacity of the container 120 may be about 0.5 litres to about 2.0 litres, for example. In one embodiment, the volumetric capacity of the container 120 is about 1 litre. The inside diameter of the container 120 may be about 50 mm, although in some embodiments, this may be varied between about 30 mm and about 80 mm, and possibly up to about 100 mm in diameter. A height of the container 120 may be around 420 mm, from its base to its top, for example. However, the height may vary, depending on the volume of liquid sample to be contained within the container 120 and/or the inside diameter of the container wall 121. Depending on the volumetric capacity of the container 120 and whether it is full of a liquid sample or not and depending on the material of the container 120, the mass of the sedimentation measurement device 110 may be in the range of about 0.2 kg to about 1 kg when empty of liquid and about 0.7 kg to about 3 kg when full. The sedimentation measurement device 110 is therefore suitably sized and arranged to be handheld and portable for manual carrying and agitation as required.

The housing 130 is configured to house most of the electronics of the sedimentation measurement device 110. For example, the housing 130 comprises a controller 132 in signal communication with the transceiver 136 in order to exchange data by network 150. The housing 130 may comprise a sealed or sealable solid plastic housing body defining an inner housing chamber to contain at least some of the electronics, for example. Although not shown in the drawings, the housing 130 may accommodate buttons, switches, lights or a display, for example to allow an operator to ascertain an operational status and/or manipulate certain functions of the sedimentation measurement device 110.

Further, the housing 130 houses a power supply 138 to supply power to all of the electrical and electronic components of the sedimentation measurement device 110. The power supply 138 may comprise a battery, such as a long life battery, for example. The housing 130 may allow manual and/or electrical jack (or inductive charging coil) access to the battery to charge and/or replace it, for example. The controller 132 accesses a memory 134 that stores programme instructions executable by the controller 132 in order to perform the functions described herein, such as controlling operation of light sources 124, light detectors 126 and communication of measurement data to external devices via transceiver 136.

In some embodiments, the base unit of the sedimentation measurement device 110 also comprises an accelerometer 135 disposed in the housing 130 that provides output to controller 132. The accelerometer 135 may be a three dimensional accelerometer to measure movement of the sedimentation measurement device 110 in any of three dimensions (x, y, z) or it may measure movement in six degrees of freedom (three spatial axes and three rotational axes).

Based on the output of the accelerometer 135, the controller 132 is configured to determine whether a minimum agitation amount has occurred for the sedimentation measurement device 110. This agitation may occur as manual agitation by an operator that has taken the sample liquid and decanted it in or otherwise placed it into the liquid chamber in the container 120. A certain degree of agitation of the liquid sample is desirable in order for the sedimentation measurement of the liquid sample to be considered to be reliable. With some prior art systems, operators may sometimes fail to agitate the liquid sample at all, which can lead to uneven distribution of solids particles within the sample, and in some instances may agitate the sample too much, which can induce more froth than is desirable in the liquid sample. Further, aggregates (flocculants attached to particles) within the sample may be relatively porous and fragile, and may be destroyed by excessive mixing.

Where it is an operational requirement for the liquid sample to be agitated prior to measurement of the settlement rate, the input of the accelerometer 135 to the controller 132 allows the controller 132 firstly to determine whether any agitation has occurred, secondly to determine whether some agitation has occurred but it is inadequate to properly agitate the sample for purposes of reliability, and thirdly to determine whether the liquid sample has been agitated too much. The controller may also be configured to monitor the output of the accelerometer during the measurement process (i.e. after agitation has occurred and while the sedimentation measurement device 110 needs to remain still so that the heavier liquids or particles settle toward the bottom of the container 120). Thus, in a fourth scenario, the controller 132 may be configured to determine whether movement of the container has occurred during settlement measuring to such a degree that the accuracy on the measurement process is questionable. In each of these first, second, third and fourth situations, the controller 132 may be configured to generate an alarm signal, either to trigger a local alarm on the sedimentation measurement device 110 (such as an audible or visual alarm), and/or to transmit an alarm signal to the server 190 and/or client device 170 via transceiver 136. The client device 170 and/or server 190 may then generate a further alarm, for example by either an audible or visual alarm at the client device 170 or by the server 190 generating and sending an alarm message to another computing device. Depending on which situation has occurred, the alarm may be transmitted or emitted differently, so that each alarm situation may be uniquely identified.

In addition to, or instead of, the accelerometer 135, an excitation coil 137 may be included within sedimentation measurement device 110 in the housing 130.

This excitation coil 137 may be responsive to control signals from the controller 132 in order to generate a selectively varying electric field in the vicinity of a bottom end of the container 120. This electric field can be controlled by the controller 132 to induce rotation of a free floating untethered bar magnet 139 that has been placed in the bottom of the container 120 for agitation purposes, for example. The chamber 122 of the container is otherwise free of fixed agitation means. Controlled application of the excitation coil 137 allows achievement of a controlled level of agitation of the liquid sample within the container 120, rather than relying on manual agitation. For example, excitation of the excitation coil 137 may be controlled by the controller 132 to occur for a set period of time prior to commencing each sample measurement task.

FIG. 1 illustrates schematically the presence of a series of light sources 124 positioned generally vertically in a linear or roughly linear array along one side of the container wall 121. These light sources 124 may be LEDs, for example, such as infrared (IR) LEDs. The light sources 124 are preferably relatively high powered (i.e. high in radiant intensity) and may be operated at a relatively high current, such as 1 amp to 5 amps, in order to generate sufficient light to penetrate the liquid sample near the mud line. An emission spectrum of each of the LEDs may have a peak at a wavelength in the range of about 880 nm to about 950 nm. A suitable high powered IR LED light source may the SFH 4544 Infrared Emitter (940 nm) available from Osram™ Opto Semiconductors, for example.

The selective activation of the light sources 124 is controlled by the controller 132 so that only selected ones of the light sources 124 are switched on according to a specific light control sequence during a measurement operation. Such light sources 124, when switched on, emit light through the container wall 121 (or at least a part thereof) in order to cause the emitted light to travel through the liquid sample.

A series of light sensors (also described as light detectors) 126, such as photodiodes, is positioned generally vertically in a corresponding linear or roughly linear array along another side of the container wall 121. The light detectors 126 are positioned generally oppositely from the light sources 124 on a chord through the cylindrical (or generally cylindrical) profile of the container wall 121. In other words, the light sources 124 and light detectors 126 are arranged on the container wall so that a path of maximum light transmission efficiency from the light sources 124 to the light detectors 126 is laterally offset from, and does not coincide with, a central longitudinal axis 224 (i.e. the centre) of the cylindrical container wall 121. The light detectors 126 are configured to detect light at wavelengths corresponding to the peak emission spectrum of the light sources 124. A suitable form of light detector 126 is the BPV10NF Silicon PIN Photodiode from Vishay Intertechnology, Inc., for example.

If the light sources 124 and light detectors 126 were disposed substantially diametrically opposite to each other, the horizontal distance of travel of light through chamber to the light detectors 126 would be at a maximum and any associated attenuation due to distance of travel would also be maximised. Some embodiments reduce the distance that the light must travel from the sources 124 to the sensors 126 by positioning the light sources 124 and light sensors 126 at opposite ends of a laterally offset chord. This allows a smaller distance of travel and therefore less light attenuation through the liquid sample. However, if the cord is too small, then the light may encounter transmission attenuation due to other effects, such as reflection or refraction from the container wall 121 due to the shallow angle of incidence from the light sources 124 into the container wall 121. It is therefore desirable that the position of the light sources 124 and light detectors 126 be radially separated (relative to the vertical centre line 224, which is shown as a point in plan view in FIGS. 2 and 4) by between about 60 degrees and about 120 degrees, optionally between about 80 degrees and 100 degrees.

In some embodiments, the light detectors 126 may be slightly offset from a notional cord line extending in the direction of initial transmission of light from the light sources 124 in the direction of the light detectors 126. This offset may be in the order of 1 to 4 degrees, for example, to account for a change in transmission angle due to refraction through the container wall 121 and/or liquid sample 122.

The light detectors 126 are individually controllable by controller 132 (as described later in this disclosure) in order to be selectively enabled to detect light. In some embodiments, the light detector 126 that is opposite a transmitting light source 124 is the one that is turned on. However, in some embodiments, a light detector 126 may be switched on to detect light from a light source 124 that is not directly horizontally opposite to the light detector 126.

The light sources 124 and the light detectors 126 may be disposed along most, but not all of the longitudinal length (height) of the container 120. For example, they may be disposed along around 50% to about 90% of the length of the container wall 121. The light sources 124 and the light detectors 126 may be substantially uniformly spaced from each adjacent light source 124 or light detector 126, or in some embodiments may be non-uniformly spaced.

Figure 5:
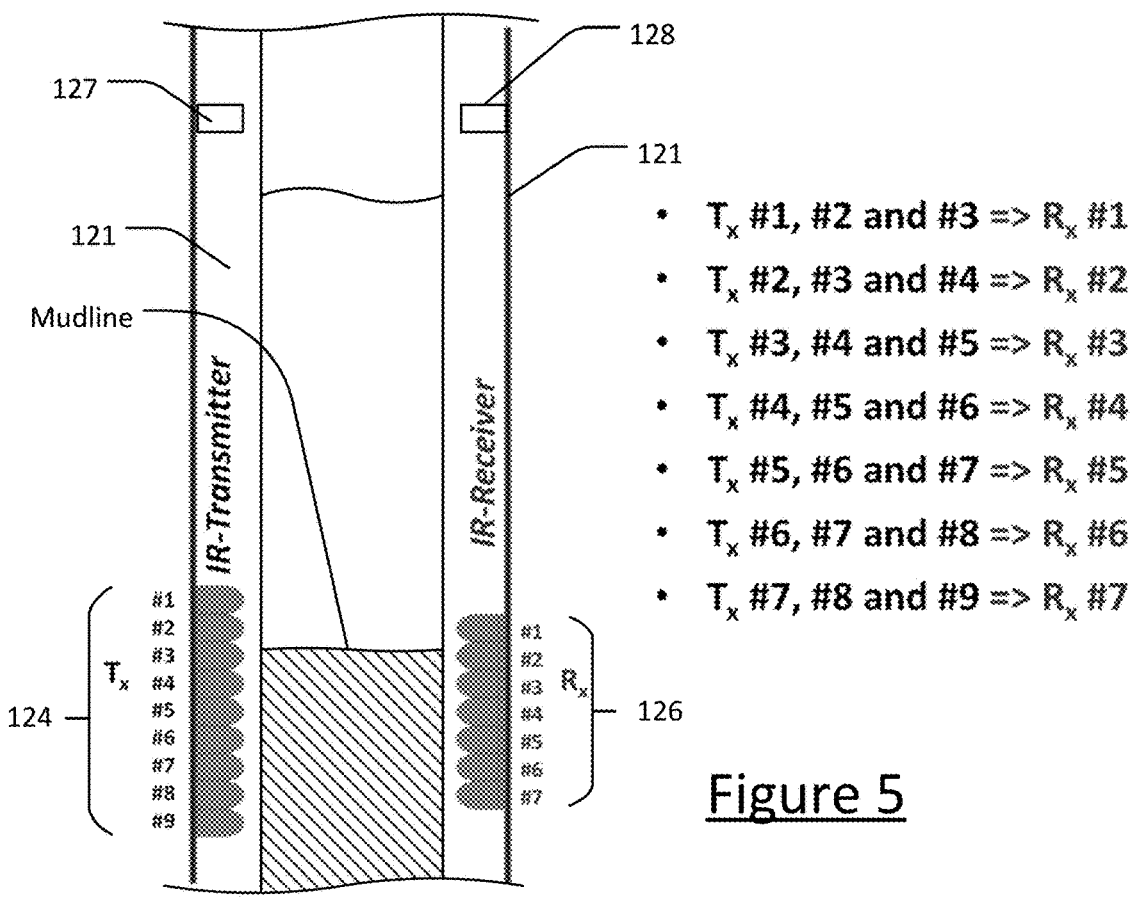
FIG. 5 is a schematic illustration in elevation view of a liquid container of the sedimentation measurement device according to some embodiments.

In some embodiments, multiple light sources, such as two adjacent or three adjacent light sources 124, may be switched on while only one opposite light detector 126 is enabled to detect light from the two or three sources. This example is diagrammatically illustrated in FIG. 5. In this example, there are nine transmitting ($T_x$) light sources 124 and seven receiving ($R_x$) light detectors 126 that are positioned generally opposite to the sources. In this example, when the first three light sources 124 (counting down from the top of the vertical array of light sources) are turned on, the first light detector 126 may also be turned on. Then, when the second, third and fourth light sources 124 are turned on, the second light detector 126 is turned on. Then, when the third, fourth and fifth light sources 124 are turned on, the third light detector 126 is turned on, and so on.

Figure 6:
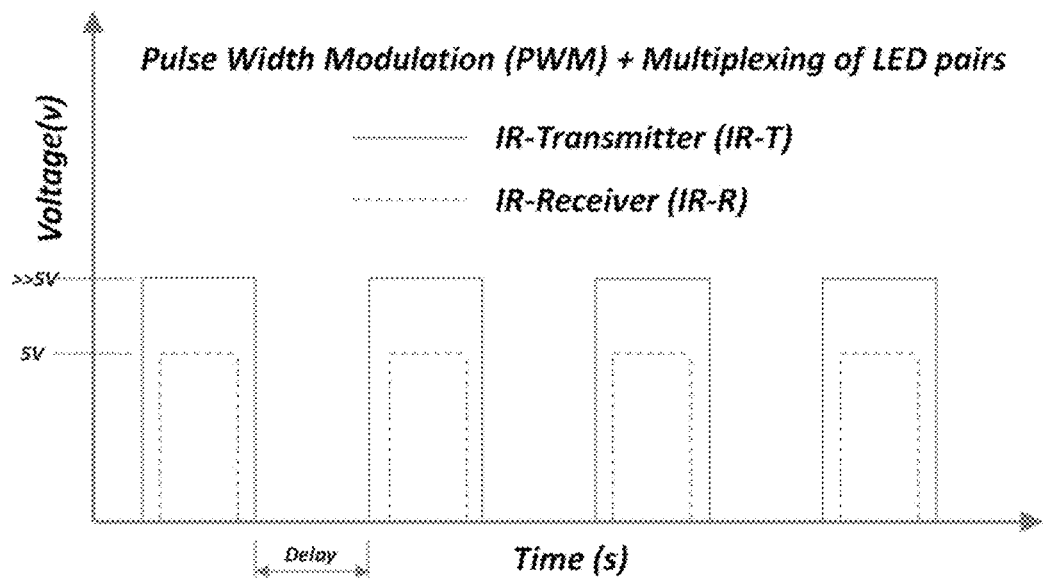
FIG. 6 is an example graph of excitation voltage applied to the light sources and light detectors over time.
Figure 7:
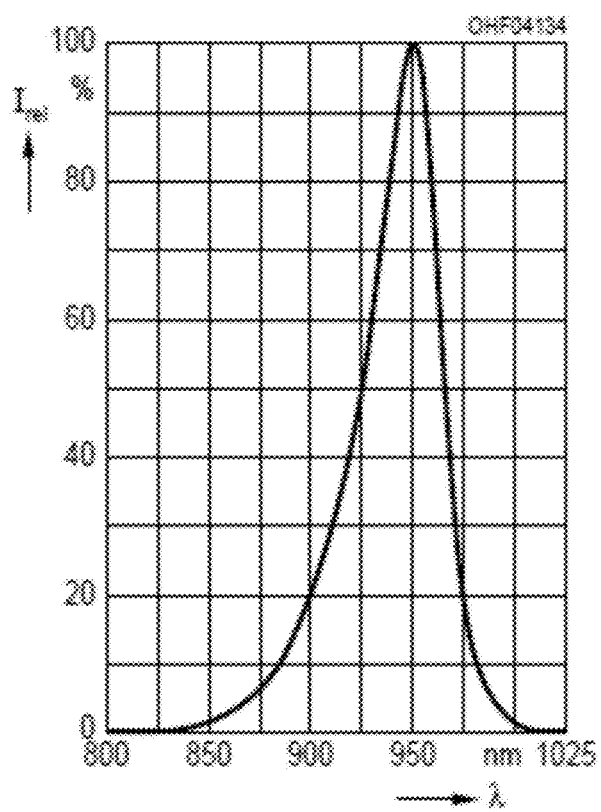
FIG. 7 is a plot of relative current (%) versus wavelength of infrared LEDs used as light sources in some embodiments.
Figure 8:
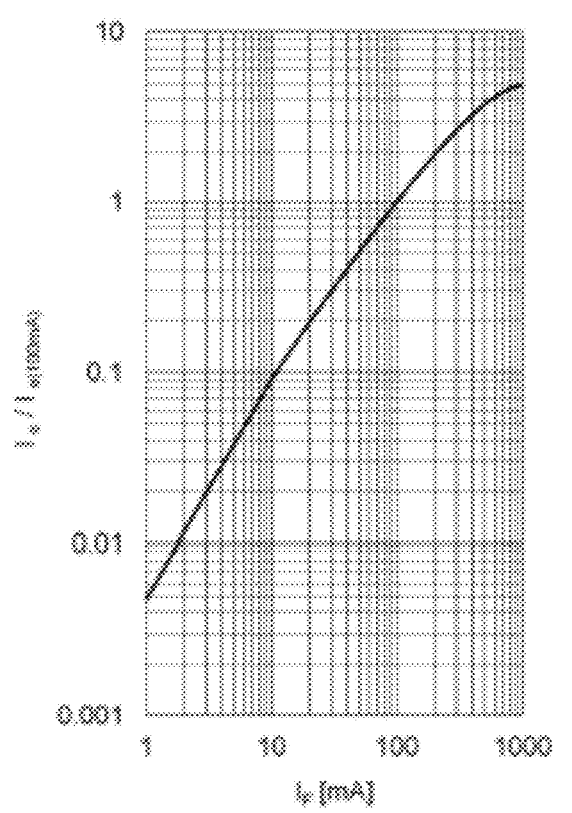
FIG. 8 is a plot of radiant intensity for the infrared LEDs used in some embodiments.
Figure 9:
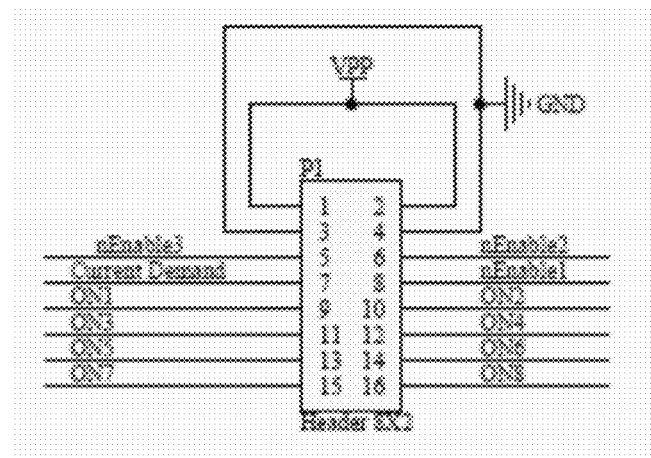
FIG. 9 is a circuit diagram of an example header chip to interface between a controller and a light source circuit.
Figure 10:
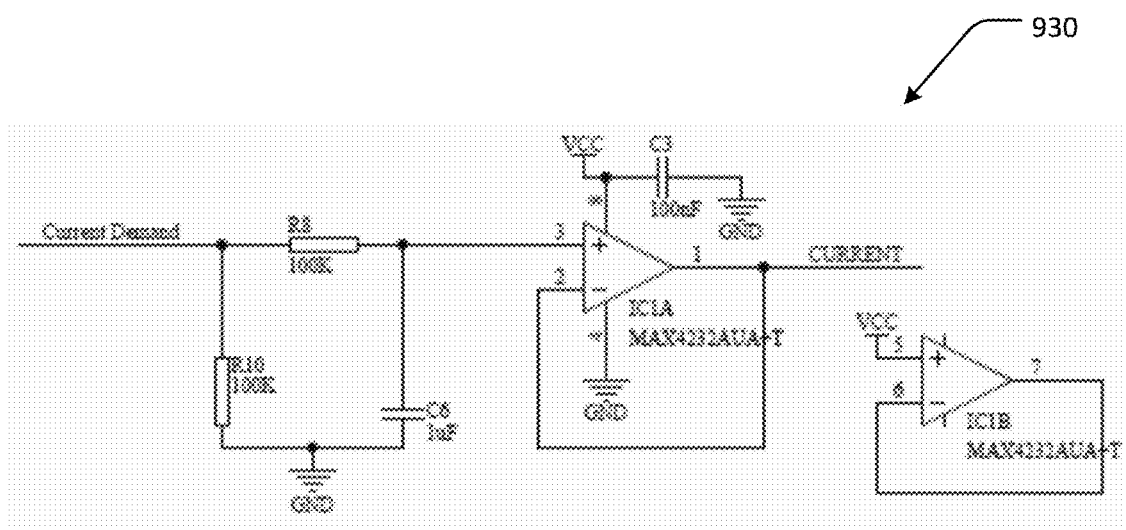
FIG. 10 is a circuit diagram of a current signal low pass filter and buffer for driving current supply to the light source circuit.
Figure 11:
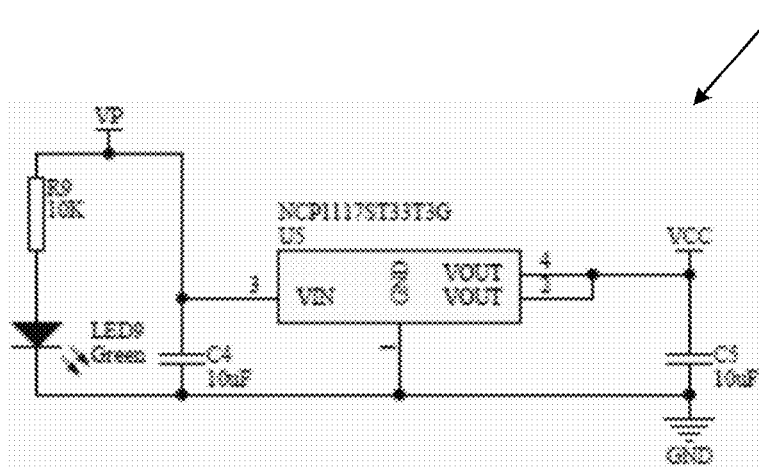
FIG. 11 is a circuit diagram of a power supply circuit for supplying power to the lighting circuit.

The controller 132 is configured to time the on and off switching of the light sources 124 and light detectors 126 so that each light detector 126 is turned on (i.e its signal output is enabled) within a time period that the one or more opposite light sources 124 is turned on, as shown in FIG. 6. The switching on of the light source 124 may be for a time in the range of about 50 milliseconds to about a 1000 milliseconds, depending on the time required to allow the light source 124 to ramp up to reach its maximum intensity. The light detector 126 positioned to detect light from that light source 124 need only be switched on for a lesser time, being a time period within which the maximum intensity of the light source 124 is achieved. However, the maximum intensity of the light source 124 may only be reached for a much shorter time, such as 1 to 500 nanoseconds, depending on the selection of 124 light sources, for example. The delay between each successive switching off and then on of one of the light sources 124 is configured as a multiple of the on time, such as an integer multiple like one to ten times.

The sedimentation measurement device 110 may further comprise one or more indicator LEDs 127, 128 responsive to control signals issued from controller 132. The indicator LEDs 127, 128 may be visible light LEDs that are turned on or caused to blink by the controller 132 to indicate a status of operation of the sedimentation measurement device 110, for example. Where the sedimentation measurement device 110 is operating to take measurements of sedimentation of a liquid sample 122, the indicator LEDs 127, 128 may be caused to blink alternatively or together. Alternatively, where inadequate agitation has occurred or excessive agitation has occurred, the LED 127, 128 may be used to indicate an alarm condition, optionally in addition to an audible alarm signal, for example. Although two indicator LEDs 127, 128 are shown in FIG. 1, some embodiments may use one such indicator LED or may use more than two. In some embodiments, the indicator LEDs 127, 128 may be positioned close to a top 123 of the container wall 121 on opposite sides thereof. Alternatively, the indicator LEDs 127, 128 may be positioned on or in the housing 130 so that light from the indicator LEDs 127, 128 is visible from the housing 130.

Figure 4:
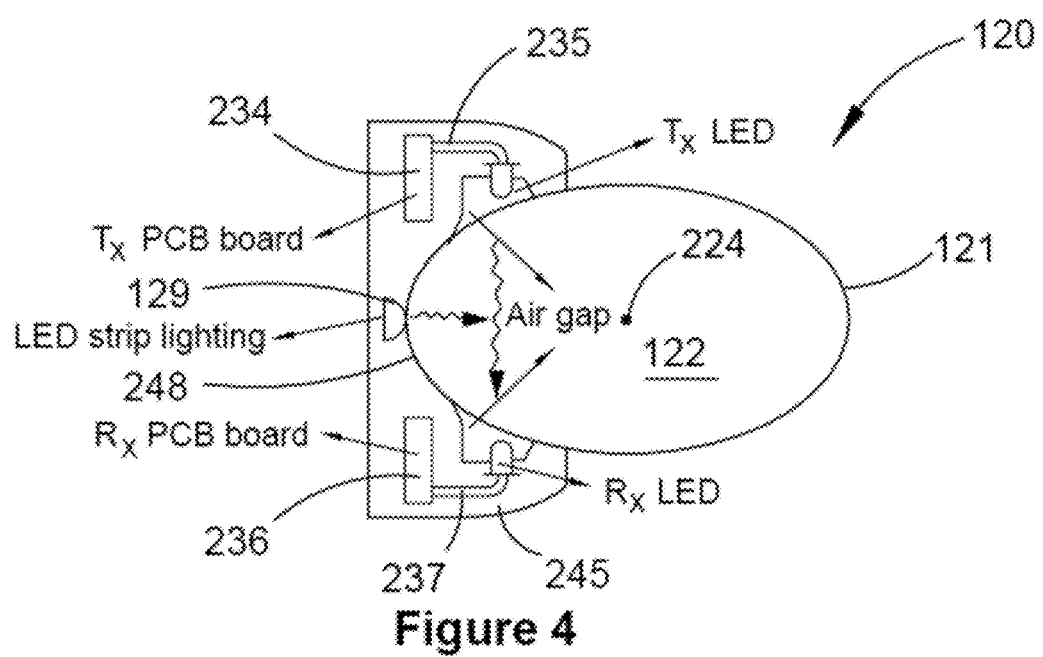
FIG. 4 is a schematic illustration in plan view of the sedimentation measurement device, illustrating positioning of light sources and light detectors according to some embodiments.

The liquid container 120 further comprises a visible light strip or array or a series of lights 129 positioned circumferentially in between the light sources 124 and the light detectors 126. The light strip or series of lights 129 emit human visible light and are selected to avoid emitting light in a range that corresponds to the detection range of light detectors 126, in order to avoid polluting the light detection signal from the light sources 124. The visible light array 129 is arranged generally vertically along the outside of the container wall 121, for example as shown in FIGS. 1 and 4 and arranged to generally transmit light from an approximate mid-point between the light sources 124 and the light detectors 126 toward an opposite side of the container wall 121 that is substantially light transmissive for human visible wave lengths. The light series 129 is intended to aid in human perception of the sedimentation process and does not factor into the automatic sedimentation rate determinations made (e.g. at client device 170 or server 190) by operation of the controller 132.

Reference is now made to the circuit diagrams shown in FIGS. 9 to 14. The controller 132 is configured to selectively control emission of light from one or a number of the light sources 124 by application of an enable signal to the header chip 910, together with a current demand signal to indicate the magnitude of DC current to be supplied to each selected light source 124, as given by signals to anyone of eight switching outputs (ON1, ON2, ON3, ON4, ON5, ON6, ON7 and ON8). These switching outputs ON1 to ON8 are provided to the transistor switches 954 that are each arranged in series with a respective light source 124, as shown in lighting circuit 952 in FIG. 12, for example. Each of the eight light sources 124 in lighting circuit 952 and its corresponding series switching output ON1 to ON8 are arranged in parallel with each other.

The light sources 124 are arranged in three groups of eight LEDs, each group of which is selected by a signal from the controller 132 to one of the enable lines 953 (enable 1), 963 (enable 2) and 973 (enable 3). Depending on which group selection is enabled and which of the switching lines ON 1 to ON8 are switched on, any or all of the LEDs (LED 1 to LED 25, noting that 24 LEDs are shown but that there is no LED 9 shown) can be turned on. For each LED light source 124 that is turned on by the controller 132, the level of current demand specified by the controller 132 is provided via the circuit 930 shown in FIG. 10 and driven by the reference currents VP and VCC shown in power supply circuit 940 in FIG. 11.

Figure 12:
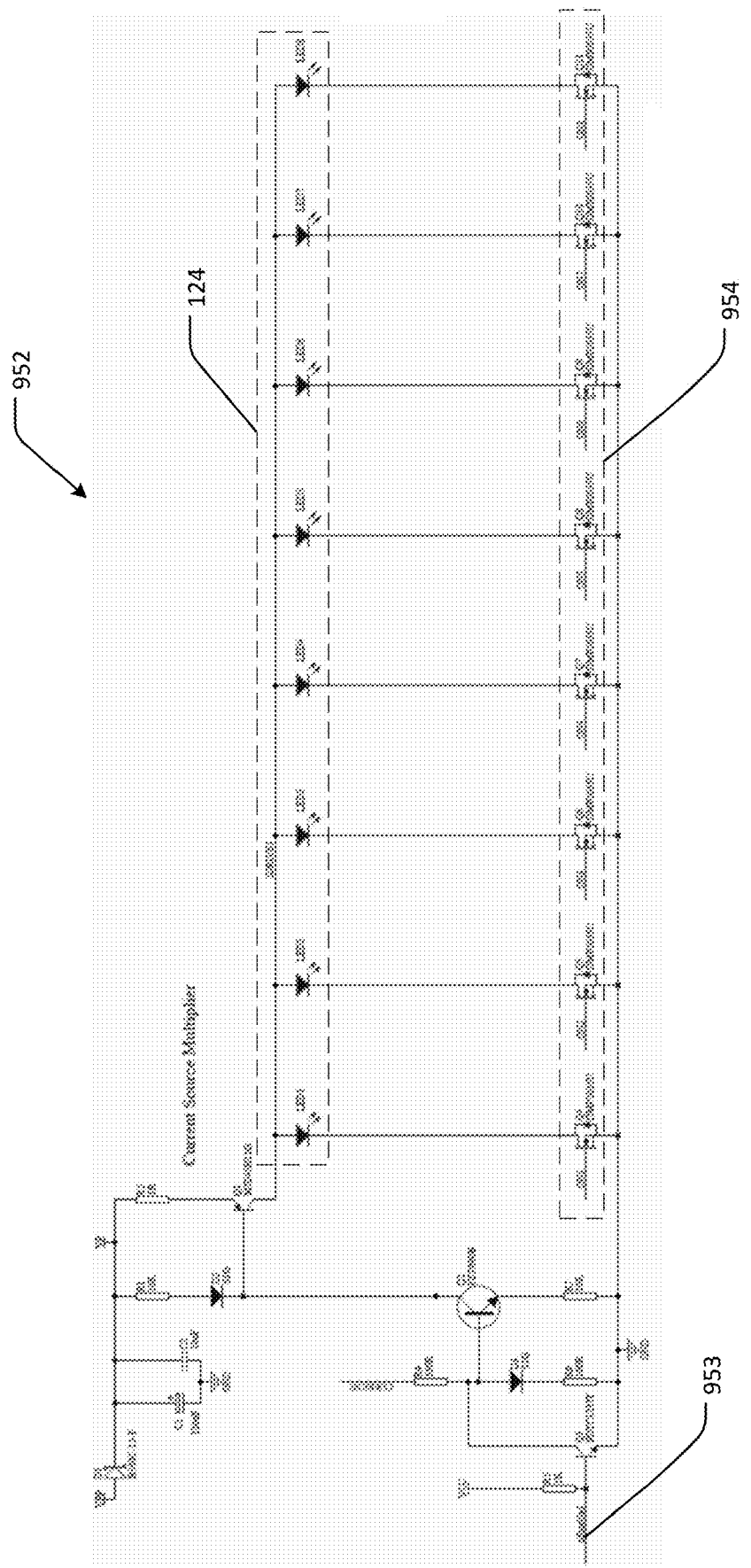
FIG. 12 is a circuit diagram of a lighting circuit.
Figure 13:
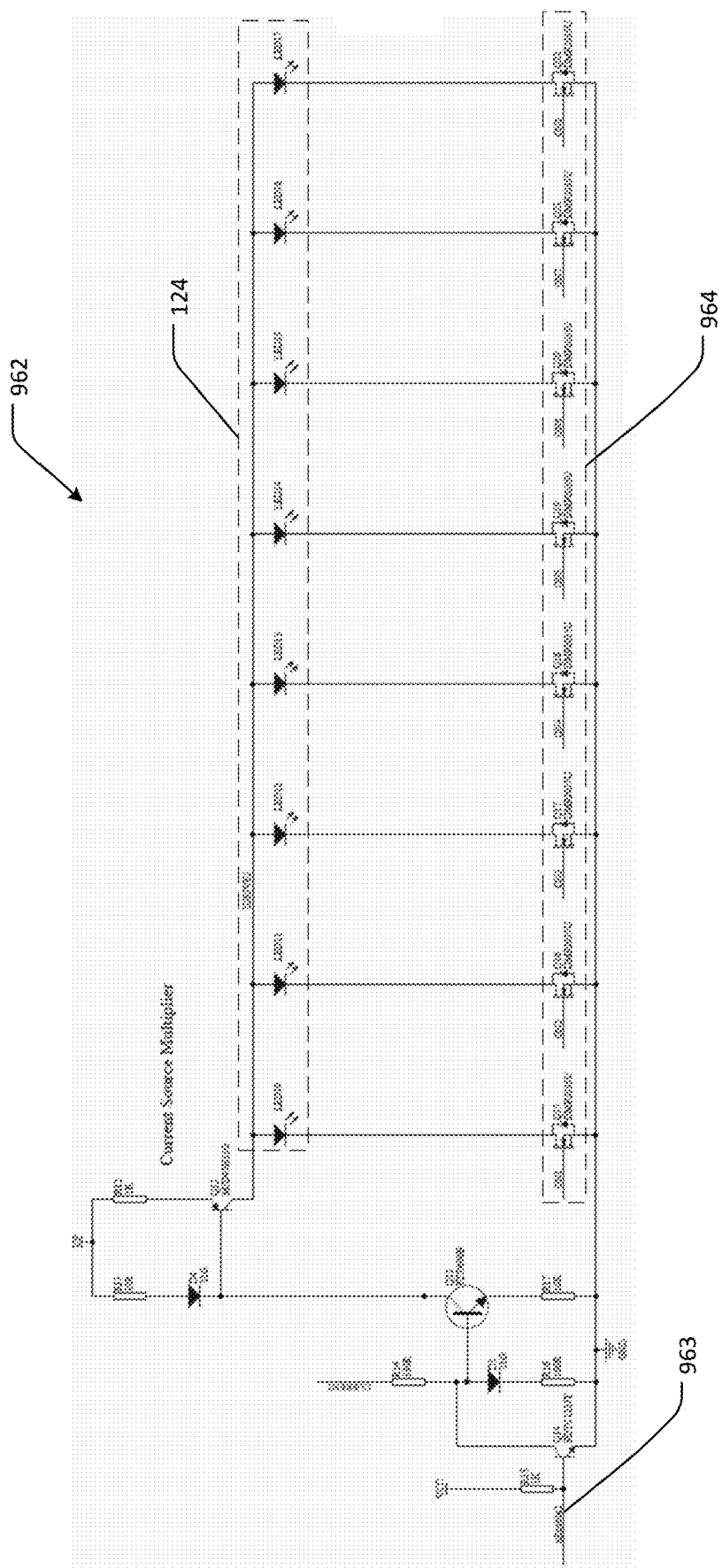
FIG. 13 is a circuit diagram of a further lighting circuit.
Figure 14:
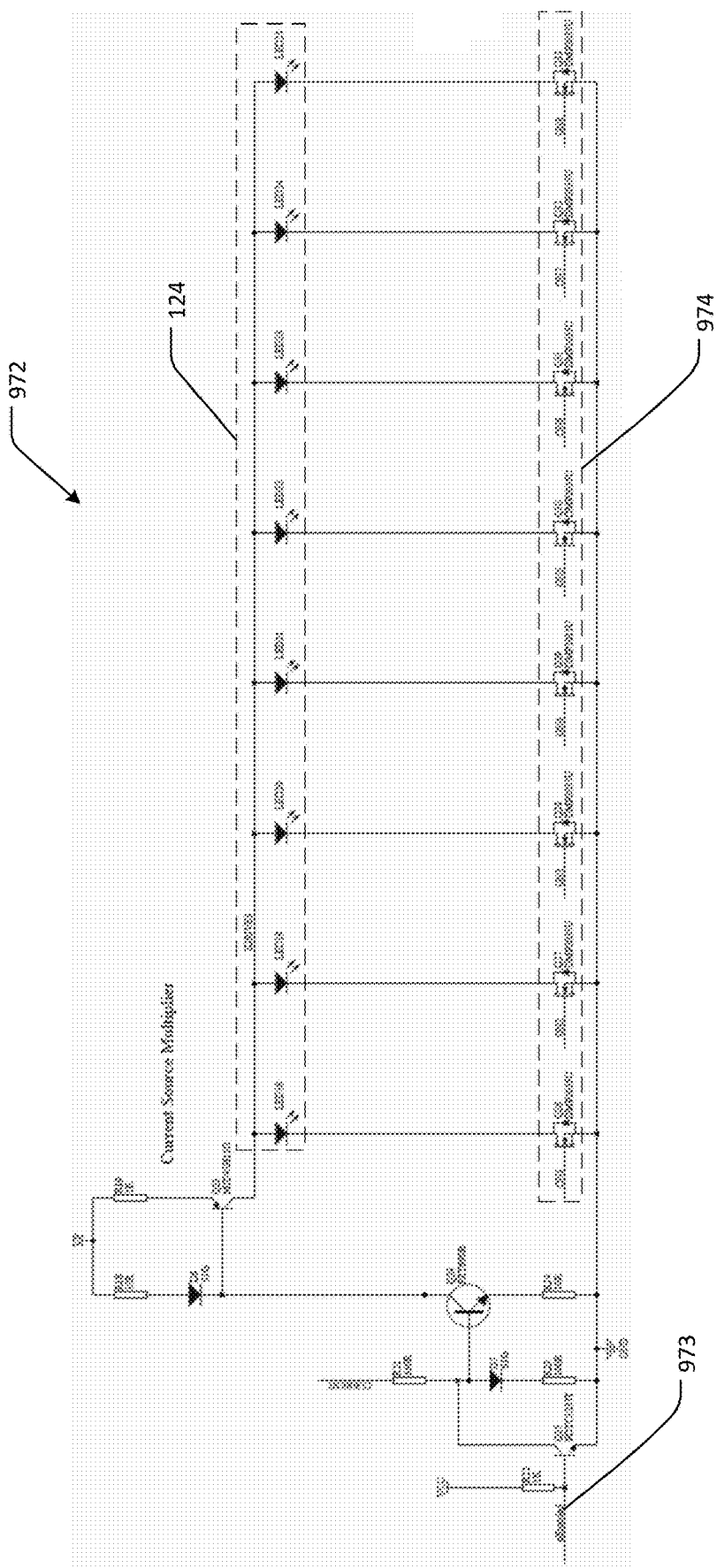
FIG. 14 is a circuit diagram of a further lighting circuit.

FIGS. 12, 13 and 14 are circuit diagrams of lighting circuits 952, 962 and 972, respectively. Each of these lighting circuits 952, 962, 972 includes eight LED light sources 124 and a series of eight selectable switch groups 954, 964 and 974 that can be selectively operated by control signals from the controller 132 when the enable signal 953, 963 or 973 is also applied by the controller 132.

Figure 15:
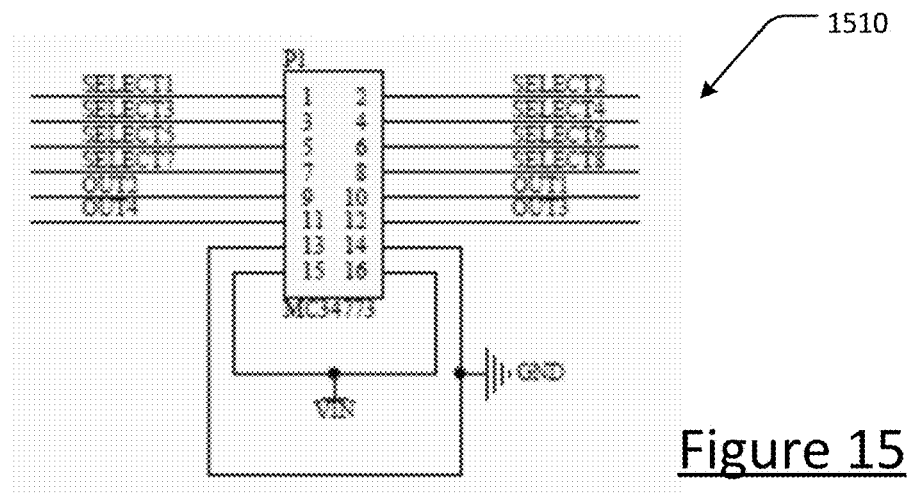
FIG. 15 is a circuit diagram of a header chip to interface with the controller and the light detectors of the sedimentation measurement device.
Figure 16:
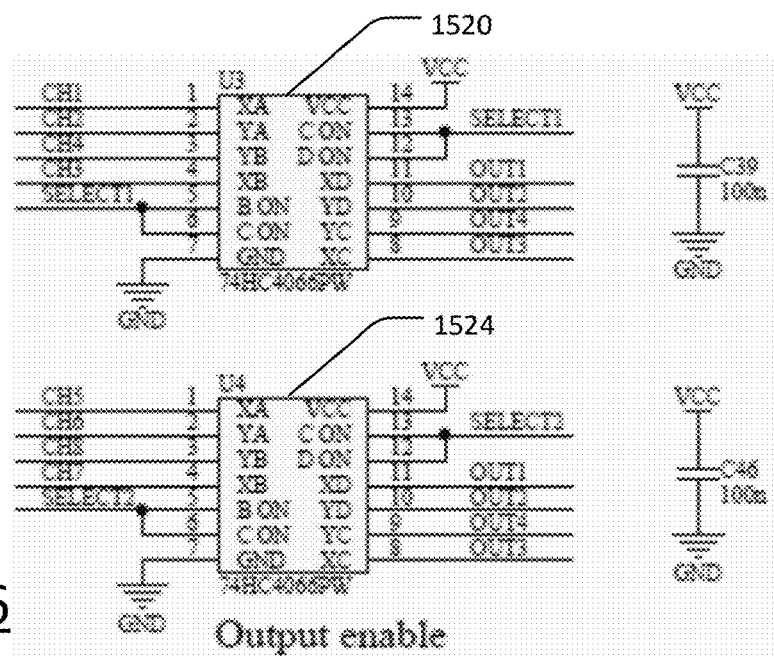
FIG. 16 is a circuit diagram of multiplexer chips to selectively enable outputs from ones of the light detectors.
Figure 22:
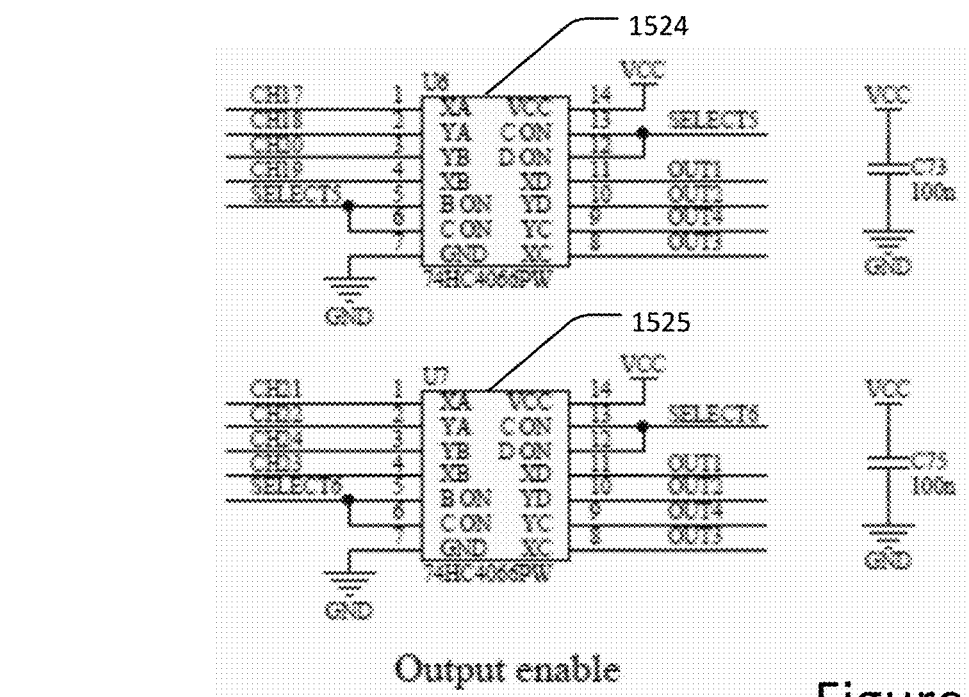
FIG. 22 is a circuit diagram of a further set of multiplexer chips to selectively enable selection of ones of a light detector.

Referring also now to FIGS. 15 to 23, the control circuitry associated with the light detectors 126 is described in further detail. In FIG. 15, a header chip 1510 is shown that receives detector selection signals (select 1, select 2, select 3, select 4, select 5 or select 6) and one or more of four output signal lines (out 1, out 2, out 3 and out 4). Each of these selection lines corresponds to one of the multiplexer chips 1520, 1521 (FIG. 16), 1522, 1523 (FIG. 20), 1524 and 1525 (FIG. 22). Each of the light detectors 126 can be selectively turned on (by having its output enabled) by a signal from the controller 132 to one of the selection outputs of multiplexer chips 1520 to 1525, which correspond to the 24 light detectors 126 shown by way of example in FIGS. 19, 21 and 23.

Each multiplexer chip 1520 to 1525 allows selection of one or more of four light detector outputs via any of the output lines (out 1, out 2, out 3 and out 4). For example, where the output of photodetector PD1 (FIG. 21) is to be enabled, channel CH9 is required to be selected on multiplexer chip 1522, which corresponds to one of the output lines out 1 to out 4 (the mapping of which to the channel lines is set at configuration), thereby returning to the controller 132 an output signal corresponding to (but filtered and amplified based on) the output of the photodetector PD1. Similarly, for the output signal of any one of the light detectors 126 to be provided to the controller 132, the controller 132 provides a selection output to the header chip 1510 to indicate any of select 1 to select 6 (or more if a larger number of light detectors 126 is required), which designates the multiplexer chip corresponding to the group of light detectors 126 the desired light detector 126 is part of. In addition to the select signal, the controller 132 provides one or more output line signals out 1 to out 4 that maps to the output channel (e.g. CH5 to CH8 for multiplexer chip 1521) that provides the output from the respective photodetector (e.g. PD13 to PD16 for CH5 to CH8).

Figure 17:
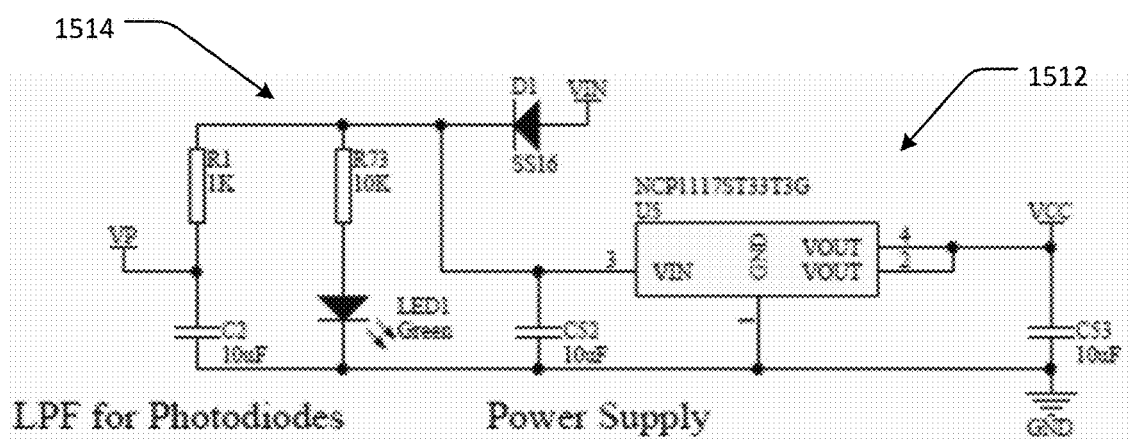
FIG. 17 is a circuit diagram of a low pass filter circuit and power supply circuit for the light detectors.
Figure 18:
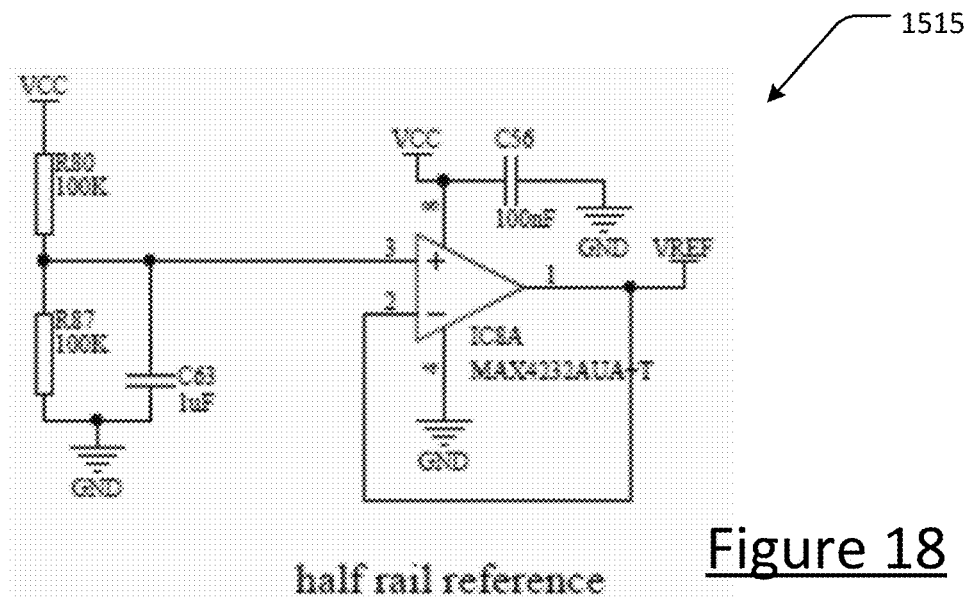
FIG. 18 is a circuit diagram of a reference voltage generating circuit for the light detectors.
Figure 20:
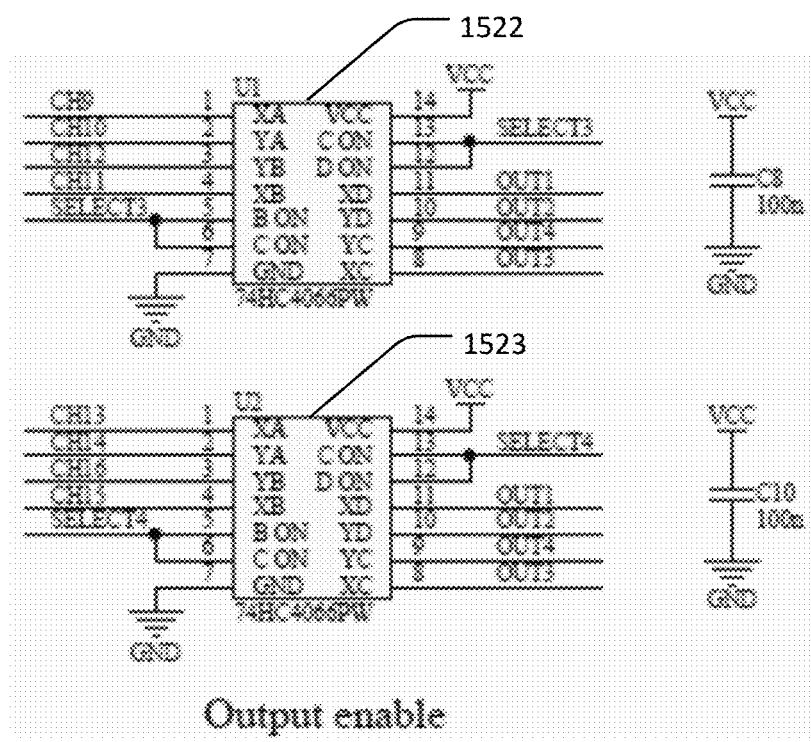
FIG. 20 is a circuit diagram of further multiplexer chips to selectively enable selection of ones of the light detectors.
Figure 19:
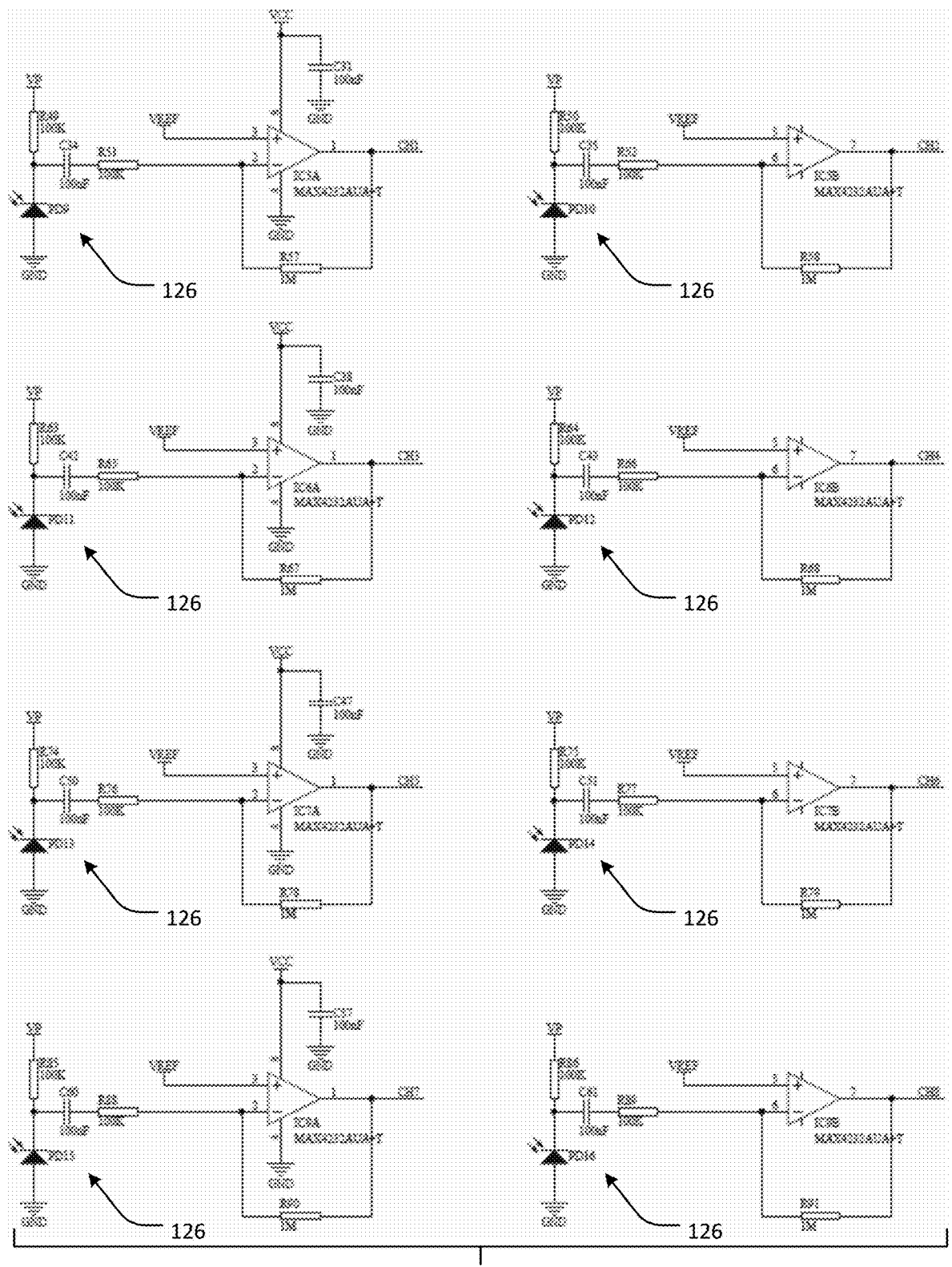
FIG. 19 is a set of circuit diagrams for multiple light detectors of a first group.
Figure 21:
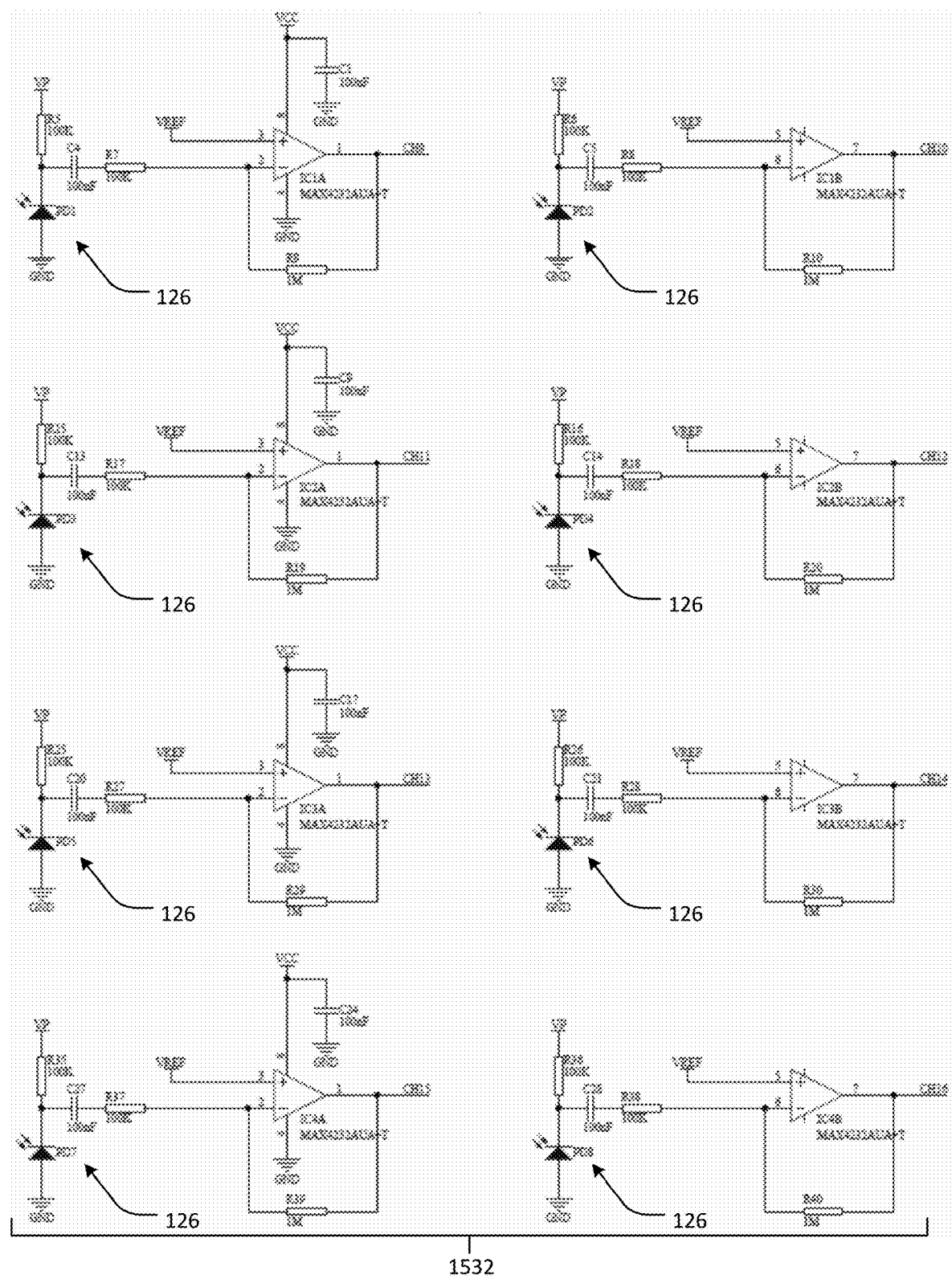
FIG. 21 is a set of circuit diagrams for light detectors of a second group.

In order to provide power to the light detector control circuitry, a power supply circuit 1512 is provided, together with a low pass filter circuit 1514, to generate appropriate reference voltage outputs, as shown in FIG. 17. Additionally, a half rail reference generation circuit 1515 (FIG. 18) is used to generate a reference voltage VREF for the amplifiers on each of the light detection circuits (shown in FIGS. 19, 21 and 23) to which the respective photodiodes PD1 to PD 24 are coupled.

Figure 2:
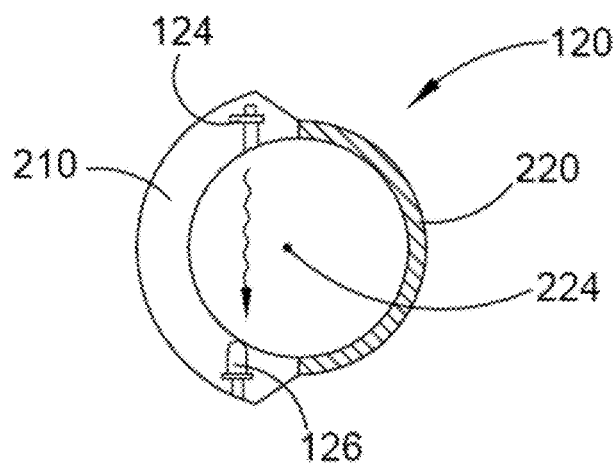
FIG. 2 is a schematic plan view in cross-section of a container of the sedimentation measurement device.
Figure 3:
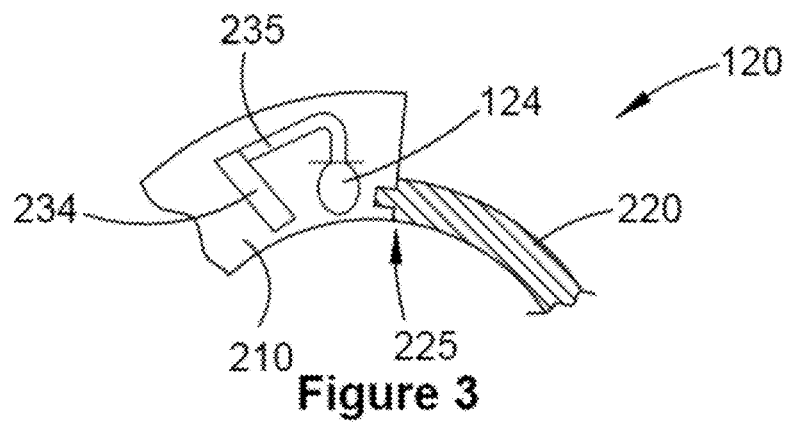
FIG. 3 is a schematic plan view in cross-section of a part of the container of the sedimentation measurement device, showing light sources and associated circuitry positioned in the container wall, according to some embodiments.

FIGS. 2, 3 and 4 show optional arrangements of the liquid container 120. Depending on a particular configuration selected for the container wall 121, and whether the light sources 124 or light detectors 126 are to be potted into a part of the container wall 121 or positioned to be slightly spaced therefrom by an air gap (i.e. as in FIG. 4), some variation in the physical constitution of the container wall 121 of the container 120 is permitted. For example, as shown in FIG. 2, the container may have a container wall that comprises an approximately half-cylindrical first part 210 that is formed of a thickened material to house or encase the light sources 124 and light detectors 126, optionally together with the drive circuitry shown in FIGS. 9 to 23 or parts thereof.

In some embodiments, as shown in FIGS. 2 and 3, the sedimentation measurement device 110 is an integrated device wherein the container 120 and the light sources 124 and/or light detectors 126 are integrally formed. For example, the light sources 124 and/or light detectors 126 may be disposed at least partially in the container wall 121.

In other words, the light sources 124 and/or light detectors 126 may be partially or fully potted into a part of the container wall 121. In some embodiments, the light sources 124 and/or light detectors 126 may be fused into or embedded within the container 120, or the container wall 121. In some embodiments, the light sources 124 and/or light detectors 126 may be disposed or encapsulated into the outside of the container wall 121.

In some embodiments, the light sources 124 and/or light detectors 126 may be disposed into the container wall 121 using a suitable potting material. The refractive index of the potting material may be altered using a suitable additive in order to optimise the transmissive power of the light sources 124 and mitigate losses due to attenuation. Nonetheless, any losses may be measurable and the integrated sedimentation measurement device 110 may be calibrated accordingly.

As the light sources 124 and/or light detectors 126 are fixed relative to the container 120, the integrated sedimentation measurement device 110 may be calibrated to account for light bending effects caused by the container 120, and for example, a thickness of the container wall 121. For example, the light sources 124 and/or light detectors 126 may be suitably aligned and/or angled to account for such light bending effects. Furthermore, a likelihood of misalignment or positioning inaccuracies between the container 120, the light sources 124 and/or light detectors 126 is mitigated or eliminated.

Further, an integrated sedimentation measurement device 110 is more robust and more portable than an non-integrated sedimentation measurement device 110 and it allows for controlled manual agitation or mixing of the contents of the container 120 by moving, shaking and/or inverting the whole integrated sedimentation measurement device 110.

Yet further, by providing an integrated sedimentation measurement device 110, settling tests or sedimentation measurement methods carried out using the sedimentation measurement device 110 may be reproducible irrespective of an operator, there providing for standardisation of the settling tests or sedimentation measurement methods.

Opposite the thickened portion 210, which is configured to be substantially non transmissive to infrared and visible light, is the approximately half-cylindrical container wall section 220 that is substantially light transmissive for human visible wavelengths, so that a person observing the sedimentation process can watch its progress through the clear wall section 220. In the embodiment shown in FIG. 2, the thickened wall portion 210, which may be positioned notionally at a "back" of the sedimentation measurement device 110 (from the user's perspective) may be generally integrally formed or otherwise sealingly coupled to the opposite "front" clear wall portion 220. The two opposite wall portions 210, 220 are shaped to generally define a substantially cylindrical chamber therebetween.

FIG. 3 illustrates an example embodiment in which the back container wall section 210 is coupled to the front of container wall section 220 in a sealing, but optionally removable, manner by a mechanical connection, such as tongue in groove or other interference- or snap-fit sealing connection. Additionally, FIG. 3 shows that, together with the LED light sources 124, a printed circuit board (PCB) 234 may be positioned closely thereby and embedded within the material of the back wall section 210. The PCB 234 may comprise some or all of the circuitry shown in FIGS. 9 to 14, for example, and is electrically coupled to the light sources 124 by suitable conductors 235.

A similar arrangement for encased and/or embedded positioning of the light detectors 126 is illustrated by embodiments shown in FIG. 4, where a PCB 236 is positioned to be embedded within a housing portion 245 (separate, connected to, or integrally formed with, housing 130) to house the detector circuitry PCB 236 and the transmitter circuitry PCB 234. The arrangement shown in FIG. 4 is similar to that shown in FIGS. 2 and 3, except that the IR LEDs 124 and IR PDs 126 are separated from the wall 121 by an air gap. In FIG. 4, there is also shown the series of lights 129 (or light strip), seen in plan view, transmitting human-visible light toward the front wall of the container 120 in a direction generally through the centre 224 of the chamber. The receiver circuitry 236 may include some or all of the circuits shown and described in relation to FIGS. 15 to 23, for example, and may be electrically coupled to the light detectors 126 via conductors 237.

In the embodiments shown in FIG. 4, the back wall 248 of a substantially cylindrical container wall 121 is substantially light-transmissive in order to allow light to travel away from the housing portion 245 towards the open light-transmissive wall on the other side of the container 120. However, the housing portion 245 in such embodiments may be substantially non-transmissive to visible light.

Embodiments described herein are, for the reasons given above, generally suitable for automatic detection of a liquid/solid blanket (or mud-line) in order to measure the efficiency of solid-liquid and liquid-liquid separation systems as a function of time using photometric non-contact infrared light attenuation measurement techniques. The IR transmitter LEDs are arranged approximately linearly (although separated from each other by a spacing of a few millimetres) adjacent to a static liquid container (cell) containing the liquid medium for which sedimentation is to be measured. A corresponding set of IR-tuned receivers are located at a certain angle opposite to the transmitters and positioned in order to obtain the maximum light intensity from the transmitter LEDs. The light detectors 126 can be fewer in number than the light sources 124 or may be the same in number. The transmitter and receiver devices (light sources 124 and light detectors 126) are positioned and aligned relative to the static liquid container, adjacent to or at least partly received within a wall thereof, in order to maximise transmitted and received signals, respectively.

The IR LED light sources 124 are selected to be relatively high-powered devices that are capable of being driven at constant currents of up to 5 times the maximum current rating of the device for a short time. For example, for an IR LED light source 124, such as the SFH 4554 OSRAM device mentioned above, that has a radiant intensity of about 550 milliwatts per steradian (mW/sr) at a drive current of 100 milliamps, the same device may be driven at up to 5 Amps in order to generate a desired level of radiant intensity for penetration through the liquid sample 122. It has been determined that such IR LEDs can operate at such high current without failure as long as they are pulsed on for relatively short periods of time, such as between 50 and 400 microseconds, and possibly up to a 1000 microseconds, as long as there is sufficient delay to allow for cooling before the next ON pulse.

Prior to conducting sedimentation measurement of a given liquid sample 122, the sedimentation measurement device 110 conducts a calibration of the IR LED power in order to obtain a reference for each LED. A signal to noise ratio (SNR) is then obtained based on the references and a light detection signal measured at the opposite light detector 126. What is stored in the memory 134 as an acceptable SNR can be user selectable (and programmed remotely through client device 170). What is considered to be an acceptable SNR may vary depending on the properties of the slurry being tested.

As part of the calibration process for each light source 124, following initial pulsing on of the light sources 124, the power of each of the light sources 124 is automatically increased by the controller 132 to a point where an acceptable SNR (i.e. of a predetermined stored threshold SNR) is achieved, and the controller 132 then stores in the memory 134 the reference power level at which the threshold SNR was mapped for each light source 124. The reference signal for each light source 124 is then subtracted from the measured signal at the corresponding light detector 126 for the duration of the measurement process for one liquid sample 122.

Since the settling rate of liquid samples from mineral slurries with high density is relatively quick, for example in the order of a few minutes (as compared to sewerage settling rates of hours), the light sources 124 are controlled by controller 132 in order to sample at a relatively high rate, for example up to about 300 hertz. For a settling rate of around 1 centimetre per second, a sample may be taken approximately every 4 milliseconds, for example.

A suitable mathematical function can be applied to determine the position of the mud-line (or blanket) as it decreases (while the container 120 is held upright and vertical) down the level of the container over time. A third order polynomial function may be used, as one example of a mathematical function. In order to determine the settlement rate, each of the measurements taken by the controller 132 from the light detectors 126 is time stamped and so, for each sampling time, the control signals driving the current level to generate a certain radiant intensity output at the IR LED light sources 124 are known, and the attenuation through the liquid sample 122 can therefore be calculated based on the control signals to the light sources 124 and the output signals of the light detectors 126. As each time stamped set of measurements is gathered by the controller 132, these are stored in memory 134 and/or transmitted immediately, after a short delay or periodically to the client device 170 via the transceiver 136.

Following is an example procedure for fitting a 3rd order polynomial (for example by a separate computing device such as the client device 170 or the server 190) to the raw data that was generated by operation of the sedimentation measurement device 110 to determine the distance (drop) over time of the mud-line/blanket/interface:

The approximate time corresponding to a transition (i.e., maximum or minimum) in the time averaged signal within a measurement time period is determined.

100 samples above the maximum value and 100 below the maximum value are used for further processing, discarding the rest of the measured values.

A $3^{rd}$ order polynomial (signal as a function of time) is fitted via the least squares minimisation technique to the selected data.

The $3^{rd}$ order polynomial (signal as a function of time) is differentiated to create a 2nd order polynomial (signal as a function of time).

The quadratic formula is used to solve the 2nd order polynomial. This gives rise to two roots, only one of which is within the data set. This value is the best estimate of the time that the signal maximum occurs, and therefore the elapsed time of settling mudline/blanket/interface since the measurement was started.

The elapsed time and the known location of the photodetectors gives the settling rate of the material being tested.

Figure 24:
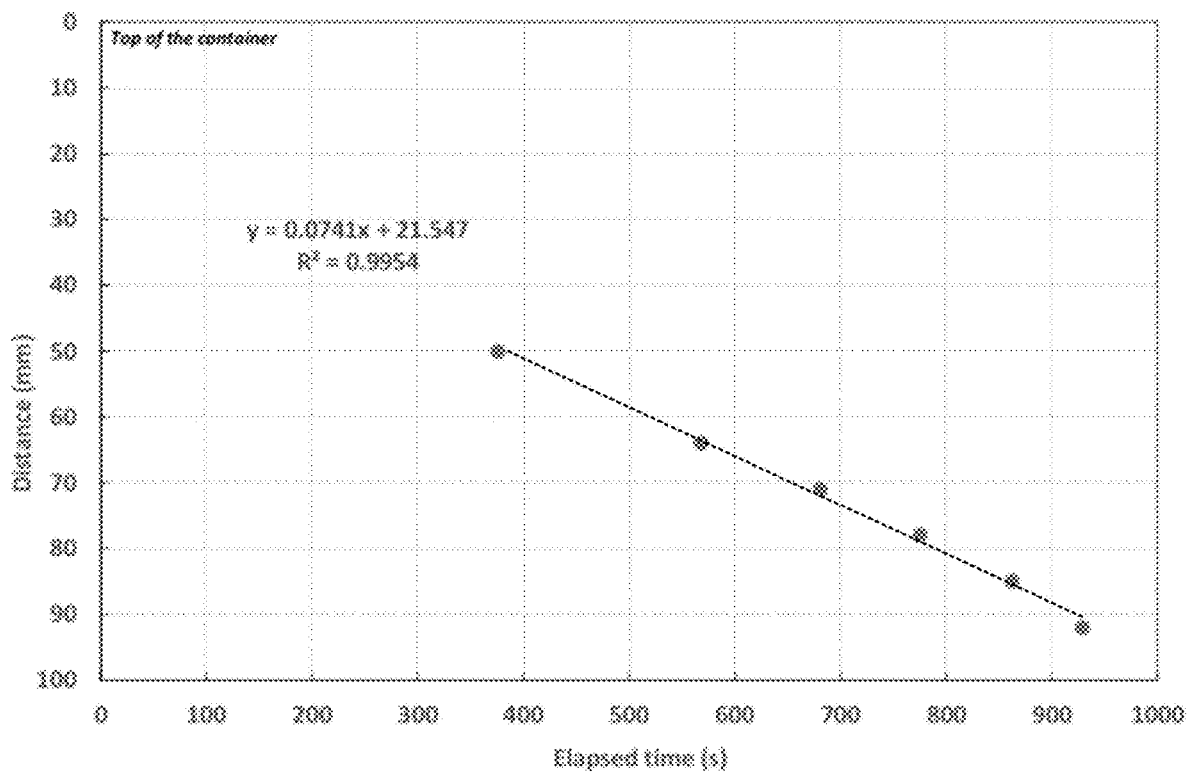
FIG. 24 is an example plot of settling rate of a sample slurry within a sedimentation measurement device according to some embodiments.
Figure 23:
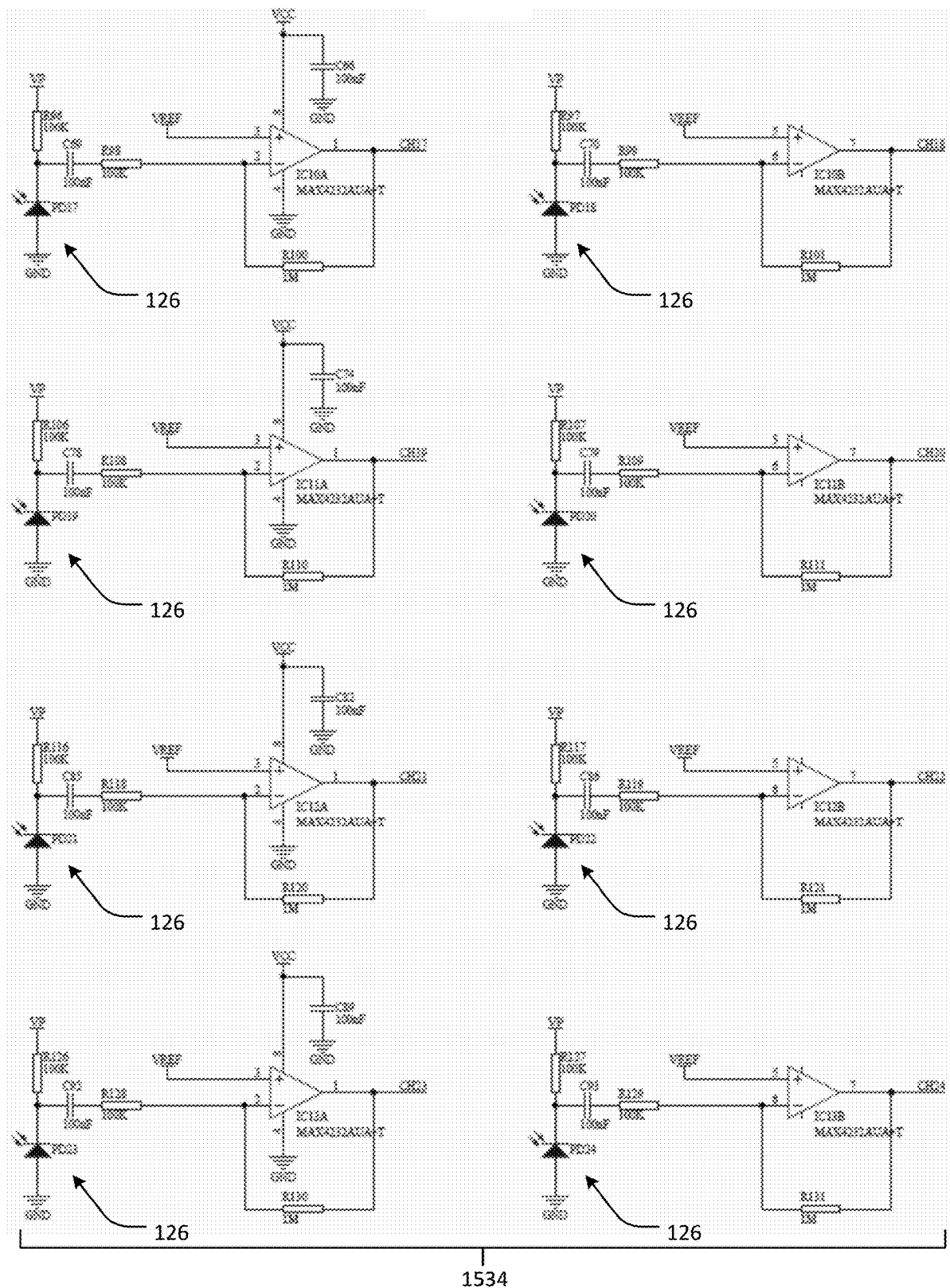
FIG. 23 is a set of circuit diagrams of light detectors of a third group.

FIG. 24 shows an example plot of elapsed time as a function of movement of the detected mud-line across 6 IR LED (124) and photodiode (126) pairs. The top of the Y-axis (0 mm) represents the container lip at the top 123 of the container 120. Each value in the plot of FIG. 24 was obtained by applying the procedure described above. The slope of the interpolation line shown in the graph represents the settling rate (mm/s) of the liquid sample 122.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A hand-held portable sedimentation measurement device, comprising:
   a closeable fluid container having a container wall and defining a chamber to receive fluid for sedimentation measurement and defining a central longitudinal axis;
   a plurality of light sources disposed along the fluid container and generally in a direction parallel to the longitudinal axis to direct light through the container wall into the chamber;
   a plurality of light sensors disposed along the fluid container and arranged to detect light passing through the chamber from at least one of the light sources;
   a controller configured to control emission of light from the plurality of light sources and to receive light detection signals from the plurality of light sensors, wherein sedimentation measurements can be obtained based on the light emitted from the plurality of light sources and the light detection signals;
   a communication interface communicably coupled to the controller and arranged to transmit sedimentation measurement data to an external computing device; and
   a housing connected to the container to house the controller and the communication interface,
   wherein the plurality of light sources and the plurality of light sensors are arranged so that a path of maximum light transmission efficiency from the light sources to the light sensors is offset from the central longitudinal axis.

2. The device of claim 1, wherein the plurality of light sources are light-emitting diodes (LEDs), wherein the LEDs are infra-red (IR) light transmitting LEDs.

3. The device of claim 2, wherein an emission spectrum of each of the LEDs has a peak at a wavelength in the range of about 880 nm to about 950 nm.

4. The device of claim 1, further comprising a battery power supply housed in the housing and arranged to supply power to all power-consuming components of the device.

5. The device of claim 1, further comprising:
   an accelerometer arranged to detect movement of the fluid container and to provide an accelerometer output signal to the controller to allow the controller to measure agitation of the fluid container.

6. The device of claim 5, wherein the accelerometer is disposed in the housing and configured to measure acceleration of the fluid container in three dimensions.

7. The device of claim 5, wherein the controller is configured to determine, based on received accelerometer output signals, whether a predetermined threshold minimum agitation amount has occurred.

8. The device of claim 7, wherein when the controller determines that agitation of the fluid chamber has ceased before the predetermined threshold minimum agitation amount has been reached, the controller is configured to generate a first alarm signal.

9. The device of claim 5, wherein the controller is configured to determine, based on received accelerometer output signals, whether a predetermined threshold maximum agitation amount has occurred.

10. The device of claim 9, wherein, when the controller determines that a predetermined threshold maximum agitation amount has occurred, the controller is configured to generate a second alarm signal.

11. The device of claim 1, wherein the number of light sensors is less than the number of light sources.

12. The device of claim 1, wherein each of the plurality of light sources and each corresponding one of the plurality of light sensors are positioned at opposite ends of a laterally offset chord of the container relative to the central longitudinal axis.

13. The device of claim 1, wherein the fluid container comprises a light shield disposed at or around a first side of the container to completely or substantially attenuate light from the light sources through the first side of the fluid container.

14. The device of claim 13, wherein a second side of the container wall that is opposite the first side is substantially light-transmissive for human-visible wavelengths of light.

15. The device of claim 14, further comprising at least one second light source configured to emit human-visible wavelengths of light and disposed on the first side to emit light toward the second side.

16. The device of claim 1, wherein the controller is configured to separately control emission of light from each of the light sources.

17. The device of claim 1, wherein the controller is configured to operate each of the light sources at a relatively high intensity for a relatively short time.

18. The device of claim 16, wherein the controller is configured to separately control each of the light sensors to detect light at a time when at least one of the light sources is emitting light.

19. The device of claim 16, wherein the controller is configured to enable light detection at only one light sensor while controlling light emission from multiple ones of the light sources.

20. The device of claim 1, wherein the light sources and light sensors are disposed at least partially in the container wall.

21. The device of claim 1, wherein the container is free of fixed internal agitation means.

22. The device of claim 1, further comprising an excitation coil in the housing to induce rotational motion of a magnet when the magnet is freely disposed in a base of the container.

23. The device of claim 1, wherein a volumetric capacity of the container is between about 0.5 litres and about 2 litres, and wherein the container is cylindrical and an inside diameter of the container is between about 30 mm and about 100 mm.

24. The device of claim 1, wherein the light sources are of a power sufficiently high to reliably penetrate a relatively high density mineral slurry sample during settling of the sample.

25. The device of claim 1, wherein the container and the light sources and/or light detectors are integrally formed.

26. A sedimentation measurement method, comprising:
receiving a sample liquid of a metallurgical process in a chamber of a liquid container having a volumetric capacity of between about 0.5 litres to about 2 litres;
transmitting control signals to one or more of multiple high radiant intensity infra-red (IR) light sources to cause light from the one or more IR light sources to be directed into the chamber through a wall of the liquid container;
detecting light passing through the chamber from the one or more light sources by at least one of a plurality of light sensors; and
determining sedimentation measurements for the sample based on the control signals and based on light detection signals received from the at least one light sensor;
wherein the light sources and the light sensors are arranged so that a path of maximum light transmission efficiency from the light sources to the light sensors is offset from a central longitudinal axis of a liquid container.

* * * * *